United States Patent [19]

Haubennestel et al.

[11] Patent Number: 4,942,213

[45] Date of Patent: * Jul. 17, 1990

[54] ADDITION COMPOUNDS USEFUL AS DISPERSING AGENTS AND DISPERSION STABILIZERS, PROCESS FOR PRODUCING THEM, THEIR USE AND SOLIDS COATED THEREWITH

[75] Inventors: Karl-Heinz Haubennestel; Wolfgang Pritschins, both of Wesel, Fed. Rep. of Germany

[73] Assignee: BYK-Chemie GmbH, Wesel, Fed. Rep. of Germany

[ * ] Notice: The portion of the term of this patent subsequent to Jan. 3, 2006 has been disclaimed.

[21] Appl. No.: 278,112

[22] Filed: Nov. 30, 1988

[30] Foreign Application Priority Data

Dec. 4, 1987 [DE] Fed. Rep. of Germany ....... 3741182

[51] Int. Cl.$^5$ ................................................ C08G 18/28
[52] U.S. Cl. ........................................ 528/28; 528/49
[58] Field of Search ................................. 528/49, 28

[56] References Cited

U.S. PATENT DOCUMENTS

| | | | |
|---|---|---|---|
| 3,684,771 | 8/1972 | Braun | 260/77 |
| 3,704,255 | 11/1972 | Braun | 260/404.8 |
| 3,741,941 | 6/1973 | Ashe | 260/78.3 R |
| 3,748,308 | 7/1973 | Ashe | 260/78.3 R |
| 3,775,327 | 11/1973 | Thompson | 252/62.54 |
| 3,788,996 | 1/1974 | Thompson | 252/62.54 |
| 3,817,944 | 6/1974 | Jones | 260/78.3 R |
| 4,029,861 | 6/1977 | Jones | 526/14 |
| 4,032,698 | 6/1977 | Ashe | 526/14 |
| 4,042,413 | 8/1977 | Hauxwell et al. | 106/308 |
| 4,048,207 | 9/1977 | Jones | 260/448.8 R |
| 4,070,388 | 1/1978 | Jones | 260/455 A |
| 4,129,455 | 12/1978 | Thompson et al. | 106/308 N |
| 4,157,266 | 6/1979 | Hauxwell et al. | 106/308 N |
| 4,163,749 | 8/1979 | Hauxwell et al. | 260/404.5 |
| 4,166,066 | 8/1979 | Hauxwell et al. | 260/404.5 |
| 4,647,647 | 3/1987 | Haubennestel et al. | 528/83 |
| 4,762,752 | 8/1988 | Haubennestel et al. | 528/83 |
| 4,795,796 | 1/1989 | Haubennestal et al. | 528/28 |

FOREIGN PATENT DOCUMENTS

| | | |
|---|---|---|
| 0018099 | 10/1980 | European Pat. Off. . |
| 0127325 | 12/1984 | European Pat. Off. . |
| 0154678 | 8/1987 | European Pat. Off. . |
| 2125064 | 12/1971 | Fed. Rep. of Germany . |
| 2241597 | 8/1978 | France . |
| 1339930 | 12/1973 | United Kingdom . |
| 1393401 | 5/1975 | United Kingdom . |
| 1393402 | 5/1975 | United Kingdom . |

*Primary Examiner*—Maurice J. Welsh
*Assistant Examiner*—Rabon Sergent
*Attorney, Agent, or Firm*—Foley & Lardner, Schwartz, Jeffery, Schwaab, Mack, Blumenthal & Evans

[57] ABSTRACT

Addition compounds suitable for use as dispersing agents and obtainable by reacting polyisocyanates having an average functionality of 2.5 to 10 with monohydroxy compounds, with compounds of formula II $$G\text{-}(E)_n \qquad \text{II}$$

wherein E represents —OH, —NH$_2$ and/or —NHR (wherein R represents an alkyl group having 1 to 4 carbon atoms) and n represents 2 or 3 and G represents an aliphatic, cycloaliphatic and/or aromatic group, and with compounds of formula III $$Z\text{-}Q \qquad \text{III}$$

wherein Q represents —OH, —NH$_2$, —NHR (wherein R represents an alkyl group having 1 to 4 carbon atoms) or —SH and Z denotes a group containing at least one nitrogen-containing, basic group. The invention also relates to processes for the preparation of these addition compounds, to their use and to pulverulent or fibrous solids which are to be incorporated into liquid systems and which have been coated with these dispersing agents.

28 Claims, No Drawings

ADDITION COMPOUNDS USEFUL AS DISPERSING AGENTS AND DISPERSION STABILIZERS, PROCESS FOR PRODUCING THEM, THEIR USE AND SOLIDS COATED THEREWITH

BACKGROUND OF THE INVENTION

The present invention relates to addition compounds or salts thereof which are suitable for use as dispersing agents and as dispersion stabilizers and which can be obtained by reacting polyisocyanates, hydroxy compounds, compounds containing Zerewitinoff hydrogen and at least one nitrogen-containing, basic group and, if appropriate, compounds containing amine nitrogen, if appropriate in the presence of solvents and, if appropriate, in the presence of reaction catalysts.

The invention also relates to a process for the preparation of these addition compounds, to their use as dispersing agents and dispersion stabilizers and to pulverulent or fibrous solids which are to be incorporated into liquid systems and which have been coated with dispersing agents of this type.

Considerable mechanical forces are required in order to introduce solids into liquid media. In order to reduce these dispersion forces it is customary to use dispersing agents which facilitate incorporation. These are, in general, surface-active compounds, also known as surfactants, having an anion-active or cation-active structure or a nonionic structure. These compounds are either applied directly to the solid or added to the dispersion medium, in small amounts. The effort of dispersion is considerably reduced by means of a surfactant of this type.

It is also known that these solids tend to reagglomerate again after the dispersion process, because of mutual forces of attraction, which frustrates the dispersion effort previously applied and results in serious problems.

Inadequate dispersion makes itself evident by an increase in the viscosity of liquid systems, losses of gloss and shifts in color shade in paints and coatings, inadequate development of color strength in pigmented plastics and reduction in the mechanical strength of reinforced plastics.

Various dispersing agents have been suggested for solving these problems, for example in U.S. Pat. Nos. 3,788,996; 3,817,944; 4,029,861; 4,032,698; 4,048,207 and 4,070,388; West German Application No. DE 2,125,064; European Application Nos. EP 18,099 and EP 127,325; French Application No. FR 2,241,597; and British Application Nos. GB 1,339,930; GB 1,393,401 and GB 1,393,402. However, these dispersing agents only result in partial solutions of the problems in the art, in particular with regard to the flocculation-free miscibility of different pigments with one another, such as organic pigments and inorganic pigments. The pigment pastes prepared by the processes described also tend to interact with the surrounding medium, for example after being introduced into paints. It can thus be concluded that the adsorption layers built up do not possess adequate stability against desorption.

According to the most recent state of the art as described in European Patent Application No. EP 154,678, the aforementioned disadvantages can be largely overcome by employing the addition compounds suggested in that text. In some cases excellent results can be achieved by means of these addition compounds. As a result of changes in technology which have moved in recent years towards high-molecular weight binders, such as are used increasingly in so-called high-solids systems, water paints and systems which can be cured by UV and electron radiation, it has been established that these compounds are still not sufficiently compatible in binder systems of these types. This results in inadequate dispersion as a result of insufficient interaction with the binder and, in many cases, in sedimentation phenomena and associated dulling, speck formation and increases in viscosity.

SUMMARY OF THE INVENTION

It is the object of the present invention to provide new compounds usable as dispersing agents or dispersion stabilizers.

Another object of the present invention is to provide dispersing agents and dispersion stabilizers which are less subject to the above disadvantages of prior art compounds.

A further object of the invention is to provide dispersing agents or dispersion stabilizers which result in dispersions of solids which exhibit little or no tendency to agglomerate after dispersion.

It is also an object of the present invention to provide dispersing agents and dispersion stabilizers which exhibit improved stability.

Yet another object of the present invention is to provide a method for preparing new dispersing agents or dispersion stabilizers.

Still another object of the present invention is to provide a new method of stabilizing dispersions.

An additional object of the invention is to provide new dispersible solids for incorporation in liquids.

These and other objects are achieved according to the present invention by providing new addition products as defined hereinafter, a method for their preparation, a method of using them to stabilize dispersions, and solids coated therewith.

It has now been found, surprisingly, that the incorporation of groups containing silicones and/or urethanes outstandingly improves the compatibility with systems of this type. The resulting dispersing agents are, as a whole, substantially more universally compatible. In addition, these groups containing silicones and/or urethanes are particularly stable to chain degradation reactions caused by, for example, hydrolysis or other effects caused by the environment, such as occur, for example, during weathering in the open. This results in increased stability in coatings of this type containing these dispersing agents.

Accordingly, the invention relates to addition compounds and salts thereof which are suitable for use as dispersing agents and as dispersion stabilizers and which can be obtained by reacting, optionally in the presence of solvents and/or reaction catalysts, polyisocyanates having an average functionality of 2.5 to 10
(a) with monohydroxy compounds of the formula I $$Y-OH \qquad \qquad I$$

in which Y has the following meanings:
(i) aliphatic and/or cycloaliphatic hydrocarbon groups which have 8 to 30 carbon atoms and in which the hydrogen atoms can be replaced partly by halogens and/or aryl radicals, or (ii) aliphatic, cycloaliphatic and/or aromatic groups which contain at least one —O— and/or —COO— group and have average molecular weights $M_n$ of 200 to 10,000, and in which the hydrogen atoms can be partly replaced by halogens, in an amount such that 10 to 70%, preferably 15 to 45% and particularly preferably 20 to 40%, of the NCO groups have been reacted, (b) reacting with compounds of the formula $$G\text{-}(E)_n \qquad \qquad II$$

in which E represents —OH, —NH$_2$, and/or —NHR (wherein R represents an alkyl group having 1 to 4 carbon atoms); n represents 2 or 3, and G represents an aliphatic, cycloaliphatic and/or aromatic group which contains at least 2 carbon atoms and has an average molecular weight $M_n$ of not more than 3000 and which may contain —O—, —COO—, —CONH—, —S— and/or —SO$_2$— groups, in an amount such that 1 to 50%, preferably 5 to 45% and particularly preferably 15 to 40%, of the NCO groups in the polyisocyanates originally employed have been reacted, a total of at least 20% and not more than 85%, preferably 30 to 65% and particularly preferably 40 to 60%, of the NCO groups in the polyisocyanates originally employed having, however, been reacted as a result of the reactions (a) and (b), and (c) reacting with compounds of the general formula III $$Z\text{-}Q \qquad \qquad III$$

wherein Q represents —OH, —NH$_2$, —NHR (wherein R represents an alkyl group having 1 to 4 carbon atoms) or —SH and Z is an aliphatic group having 2 to 10 C atoms and having at least one tertiary amino group or is a heterocyclic group having at least one basic ring nitrogen atom which does not contain a hydrogen atom, it being possible for the heterocyclic group to be attached to the group Q via an alkylene group having up to 10 C atoms, in an amount such that there is at least one molecule of compound Z-Q for each unreacted isocyanate group remaining in the stages (a) and (b);

wherein at least 1 mole % of the compounds of formula I defined above have been replaced by compounds of formula Ia $$Y'\text{—OH} \qquad \qquad Ia$$

in which Y' represents an aliphatic, cycloaliphatic and/or aromatic group having average molecular weights $M_n$ of 200 to 10,000, it being possible for the hydrogen atoms to be partly replaced by halogens, which contains at least one —NHCOO— group, and/or at least 1 mole % of the compounds of formula I defined above have been replaced by monohydroxyfunctional polyacrylic acid esters and/or polymethacrylic acid esters and/or copolymers thereof having up to 50 mole % (relative to monomer units) of comonomers, such as vinyl esters, vinyl ethers, styrene, vinyltoluene and/or vinylcyclohexane, and having an average molecular weight $M_n$ of not more than 10,000, and/or at least 1 mole % of the compounds of formula II defined above have been replaced by compounds of the formula IIa $$G'\text{—(OH)}_n \qquad \qquad IIa$$

in which G' represents an aliphatic, cycloaliphatic and/or aromatic group which contains at least 2 carbon atoms and has an average molecular weight $M_n$ of not more than 3000 and which contains at least one —NHCOO— and/or —Si(CH$_3$)$_2$O— group, and n represents a number 2 to 3.

The invention also relates to the process for the preparation of the addition compounds of the invention as described herein.

The invention further relates to the use of the addition compounds described above as dispersing agents and as dispersion stabilizers.

The invention additionally relates to pulverulent or fibrous solids which are to be incorporated into liquid systems and which have been coated with these addition compounds as dispersing agents and as dispersion stabilizers.

DETAILED DESCRIPTION OF PREFERRED EMBODIMENTS

It is important that at least 1 mole %, preferably 5 mole % and particularly preferably 50 mole %, of the compounds according to formula I and/or formula II should have been replaced by compounds according to formula Ia or IIa, respectively. For example, it is possible to react the polyisocyanate only with compounds according to formulas Ia, II and III or only with compounds according to formulas I, IIa and III.

It is also possible, however, to employ mixtures of different polyisocyanate compounds and compounds according to formulas I, Ia, II, IIa and/or III for the preparation of the addition compounds according to the invention. The reaction of the polyisocyanates with the compounds of formulas I to III can be carried out in a single reaction stage or in several successive reaction stages. This can be carried out in any desired sequence, and it is also possible to combine two reaction stages. For example, after the polyisocyanates have been reacted with the appropriate amount of compound of formula I and/or Ia, the further reaction can be initiated by adding a mixture of the compounds of formula II and/or IIa and III. In many cases, however, it is advantageous to react the polyisocyanate with the components in three successive individual stages in the sequence I and/or Ia, II and/or IIa, and III.

Pulverulent or fibrous solids which may be used with or in the invention are those solids such as have been coated according to the state of the art with dispersing agents, particularly organic and inorganic pigments which are employed in paints, coating agents, molding materials or other plastics, and inorganic or organic fillers which are employed for filling or reinforcing paints, coating agents, molding compositions or other plastics. A subgroup of fillers of this kind comprises organic and/or inorganic fibers which are also used as fillers or reinforcing materials.

Examples of pigments which may be used with or in the invention include mono-, di-, tri- and poly-azo pigments, oxazine-, dioxazine- and thiazine-pigments, phthalocyanines and other metal complex pigments, indigoid pigments, diphenylmethane, triarylmethane, xanthene, acridine, quinacridone and methine pigments, anthraquinone, pyranthrone, perylene and other polycyclic carbonyl pigments, inorganic pigments based on carbon black, graphite, titanium dioxide, zinc oxide, zinc sulfide, zinc phosphate, barium sulfate, lithophone, iron oxide, ultramarine, manganese phosphate, cobalt aluminate, cobalt stannate, cobalt zincate, antimony oxide, antimony sulfide, chromium oxide, zinc chromate, mixed metal oxides of nickel, titanium, zinc, manganese, cobalt, iron, chromium, antimony, magnesium, aluminum (for example nickel-titanium yellow or chromium-titanium yellow), magnetic iron oxides and chromium oxides, metal effect pigments, such as aluminum bronzes, nacreous pigments and fluorescent and phosphorescent luminous pigments.

Examples of pulverulent or fibrous fillers which may be used with or in the invention include those which are composed of pulverulent or fibrous particles of aluminum oxide, aluminum hydroxide, silicon dioxide, diatomaceous earth, silica, quartz, silica gel, talc, kaolin, mica, perlite, feldspar, ground slate, calcium sulfate, barium sulfate, calcium carbonate, calcite, dolomite, glass or carbon.

Pulverulent or fibrous solids of this type having a coating of dispersing agents and dispersion stabilizers according to the invention are prepared in a manner which is in itself known in which, instead of the dispersing agents known in the state of the art, those according to the invention are employed. In the field of fibrous materials, these dispersing agents are frequently also called sizes. The solids can be coated for this purpose with a solution or emulsion of the addition compounds according to the invention, for example in a fluidized bed. The solvent or emulsifier can then be removed, but it can also remain in the mixture, so that pastes are obtained. Another possible means consists, for example, in making the solids to be coated into a paste in a liquid medium and adding the addition compounds according to the invention to this paste.

Here too, the making into a paste can be carried out by obtaining a processable paste, the liquid medium for making the paste being, of course, adapted to suit the subsequent end use of this paste, for example pigment paste.

There are several possibilities for applying the addition compounds according to the invention to the solid surface of pigments. This procedure can be carried out during or after the synthesis of pigments by adding the addition compounds to the aqueous pigment suspension, to the suspension of pigment in water/solvent mixtures or to the suspension of pigment in solvents—if desired before, during or after a pigment finishing process or during further processing of pigments in the medium of use.

The addition compound can be added to the aqueous pigment suspension in solvents which are at least partially soluble with water, for example aliphatic alcohols having 1-6 carbon atoms, such as ethanol; glycols, glycol ethers and glycol esters, such as propylene glycol, ethylglycol acetate or methoxypropyl acetate; ketones, such as acetone or methyl ethyl ketone; or carboxamides, such as dimethylformamide or N-methylpyrrolidone.

If carried out in conjunction with a thermal aftertreatment of a pigment—for instance in order to increase the hiding power of the latter or to improve other technical properties in use—it is advantageous to add the addition compound in the solvent in which the thermal aftertreatment is carried out.

The addition of the addition compound or a solution thereof can be carried out before, during or after a surface-finishing process. The solvent can then be removed rapidly and quantitatively, for example by means of steam, and the addition compound can be applied to the surface of the pigment particularly easily and with a high degree of effectiveness. The pigment formulated in this way can then be isolated from the remaining aqueous suspension.

The application of the addition compound can also be carried out without a previous or subsequent thermal treatment (finishing) of the pigment, by distilling off, for instance by means of steam, the solvent used immediately after the additive solution has been added to the aqueous pigment suspension with vigorous stirring.

In the simplest case, the dissolved addition compound can be employed, in the form in which it is prepared and without prior isolation, for coating the surface of the pigment. If—as a result of its synthesis—the addition compound is present in a solvent which results in undesirable color changes in the pigment or in technical difficulties when it is applied to the pigment suspension, it is advantageous to convert the addition compound into a usable form, suitable for the particular pigment, that is to say to wholly or partly remove the solvent and, if appropriate, to replace it with more suitable solvents. If the addition compound is of a basic nature, it can be advantageous to neutralize it or to render the pigment suspension slightly acid by means of acid compounds, such as carboxylic acids, preferably acetic acid.

Compared with the untreated comparison pigments, the pigments formulated in accordance with the invention are distinguished in paints by excellent rheological properties and by a markedly improved gloss, viscosity and flocculation behavior and often also by a higher tinctorial strength.

The use of addition compounds according to the invention as dispersing agents and as dispersion stabilizers can also be accomplished, however—as in the state of the art for known dispersing agents—by adding the addition compounds to systems of any kind, for example paints, mixtures of plastics and the like, which already contain in dispersed form the solids which are to be incorporated, such as pigments, fillers or fibers.

The polyisocyanates employed for the preparation of the addition compounds according to the invention may be the same compounds which can be used in this technical field according to the state of the art. They must, however, have an average functionality of 2.5 to 10. Examples are described in U.S. Pat. No. 4,647,647, which is incorporated herein by reference.

Other examples of polyisocyanates obtainable as commercial products are Desmodur VL (a polyisocyanate based on diphenylmethane diisocyanate (MDI) made by Bayer), Desmodur Z 4370 (a polyisocyanate based on isophorone diisocyanate (IPDI) made by Bayer), Polurene KD (a polyisocyanurate based on toluene diisocyanate (TDI) made by SAPICI), Uronal RA.50 (a polyisocyanurate based on TDI made by Galstaff), Polurene A (a polyisocyanate based on TDI-trimethylolpropane (TMP) made by SAPICI), Polurene MC (a polyisocyanate based on TMP-IPDI made by SAPICI) or Polurene MD.70 (a polyisocyanate based on TMP-TDI-MDI made by SAPICI).

These compounds are commercial products which are often not present in a pure form, but are mixtures of certain compounds having similar structure. Average functionality is understood to mean that, with respect to the isocyanate groups, the commercial products have the indicated functionality of 2.5 to 10, preferably 3 to 6. For example, "functionality of 3" denotes that a molecule contains 3 free isocyanate groups on a statistical average. The average functionality can be determined experimentally by measuring the average molecular weight $M_n$. In addition, the NCO number is measured and the NCO equivalent weight is calculated from this. The average functionality is the average molecular weight divided by the NCO equivalent weight.

Monohydroxy compounds of formula I which can be employed include aliphatic, cycloaliphatic and/or araliphatic compounds having in each case 8 to 30 carbon atoms. It is also possible to employ mixtures of such compounds.

Linear and branched aliphatic or araliphatic compounds can be employed. They can be saturated or unsaturated. Saturated compounds are preferred. The hydrogen atoms may also be partly replaced by halogens, preferably by fluorine and/or chlorine. Examples of suitable monohydroxy compounds are described in U.S. Pat. No. 4,647,647, which is incorporated herein by reference.

Monohydroxy compounds of formula I which can be employed also include those containing at least one —O— and/or —COO— group. These are, therefore, polyethers, polyesters or mixed polyether-polyesters. Examples of such compounds are also described in U.S. Pat. No. 4,647,647, which is incorporated herein by reference. Other examples include polyesters which contain, as the starting component, allyl alcohol or monohydroxyfunctional acrylates, such as hydroxyethyl acrylate.

Compounds of formula I which are preferred are polyesters which can be obtained by polymerizing a lactone by means of a monohydroxy starting component, as described in U.S. Pat. No. 4,647,647, and which have an average molecular weight $M_n$ of 350 to 5000.

Monohydroxy polyethers such as are obtained by alkoxylating alkanols, cycloalkanols and phenols can also be employed as compounds of formula I. These polyethers advantageously have a molecular weight within the range of about 350 to 1500.

Monohydroxyfunctional polyacrylic acid esters and/or polymethacrylic acid esters, such as are obtained by polymerizing acrylic acid esters or methacrylic acid esters, respectively, with the addition of a monohydroxy-functional polymerization regulator, can be employed as the compound of formula Ia. Monohydroxyfunctional polyacrylic acid esters or polymethacrylic acid esters are those containing, on average, one hydroxyl group in the molecule. Compounds of this type have already been used in this field of art for the preparation of other dispersing agents, such as are described, for example, in U.S. Pat. No. 4,032,698, which is incorporated herein by reference. The preparation of these compounds by free-radical polymerization takes place, for example, in accordance with the following reaction scheme:

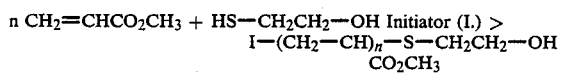

These polyacrylates advantageously have an average molecular weight $M_n$ of 300 to 10,000, preferably 500 to 5000.

As is known to those skilled in the art, the control of the desired average molecular weight is effected via the concentration of regulator and initiator and the reaction temperature: the higher the temperature and the concentration of regulator and initiator, the lower the average molecular weight obtained.

Regulators (for example 2-mercaptoethanol and 2-mercaptopropanol) and initiators (for example dibenzoyl peroxide, azobisisobutyronitrile and the like) which are customary in the art can be used to control the reaction. For better temperature regulation, it is desirable to carry out the polymerization discontinuously under reflux in a suitable inert solvent at temperatures of about 50°–120° C. When the monomer content is fairly high, it is advantageous to start with the greater part of the solvent and only a small amount of the reactants, and then add the remainder of the reaction solution in accordance with the progress of the reaction.

The carboxyl group of the monomeric acrylates or methacrylates can be esterified with aliphatic, cycloaliphatic and/or aromatic alcohols, such as methanol, butanol, cyclohexanol, 2-ethylhexanol, lauryl alcohol, stearyl alcohol, isobornyl alcohol or benzyl alcohol, or with ether-alcohols, such as 2-methoxyethanol, 2-phenoxyethanol, tetrahydrofurfuryl alcohol or glycidol, or with polyester-alcohols, such as hydroxyfunctional polycaprolactone, or with alkoxypolyalkylene glycols, such as methoxypolyethylene glycol or methoxypolypropylene glycol. The average molecular weight $M_n$ of the esterification component is preferably below 2000. It is also possible to employ mixtures of various monomers described above in order to prepare the hydroxyfunctional polyacrylates or polymethacrylates.

Vinyl esters such as vinyl acetate, vinyl ethers such as vinyl ethyl ether, styrene, vinyltoluene and/or vinylcyclohexane can also be used as comonomers for the preparation of these polyacrylates or polymethacrylates. The resulting copolymers advantageously contain not more than 50 mole % of non-acrylicfunctional comonomers.

Polyurethanes, polyether-polyurethanes, polyester-polyurethanes and/or polyether-polyester-polyurethanes which can be obtained by the addition reaction of a diisocyanate with a dihydroxy compound in the presence of a monohydroxy compound can also be employed as monohydroxy compounds of formula Ia. The reaction takes place, for example, in accordance with the following reaction scheme:

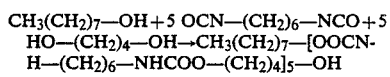
HO—(CH$_2$)$_4$—OH→CH$_3$(CH$_2$)$_7$—[OOCN-
H—(CH$_2$)$_6$—NHCOO—(CH$_2$)$_4$]$_5$—OH In this case, the average molecular weight $M_n$ of the polyaddition compounds is advantageously 300 to 6000, preferably 500 to 3000.

In general, mixtures of monofunctional and difunctional compounds together with nonfunctional compounds are formed in this polyaddition reaction. The formation of difunctional compounds can be repressed by using appropriately stoichiometric amounts of monohydroxy compounds. The formation of byproducts which are not monofunctional can also be repressed by carrying out the reaction in a selective manner, that is to say by using a low reaction temperature and carrying out the reaction in stages. This applies particularly if starting materials having functional groups of differing reactivity are employed, such as isophorone diisocyanate, 2,4-toluene diisocyanate or 1,2-butanediol.

In general, the byproducts which are formed as a mixture with the monohydroxy compounds do not interfere with the further reaction. The reaction products thus obtained can, therefore, be used without further treatment for the reaction with the polyisocyanates.

The aliphatic, cycloaliphatic and/or aromatic diisocyanates which are known from polyurethane chemistry and which have 4 to 15 carbon atoms, such as tetramethylene-, hexamethylene-, trimethylhexamethylene-, dodecamethylene-, isophorone-, toluene- or diphenylmethane-diisocyanate, methylene bis-(4-cyclohexylisocyanate) or 1,4-cyclohexane-bis-(methyl isocyanate), can be employed as the diisocyanate. It is advantageous to employ, as the dihydroxy compounds for the synthesis of the urethane group containing compounds according to formula Ia, diols having 2 to 12 C atoms, polyoxyalkylene glycols and dihydroxyfunctional polyesters having molecular weights of preferably not more than 2000, such as have also been described as compounds according to formula II. Monoalcohols having up to 30 C atoms, such as have already been described for the preparation of the polyesters according to formula I, but also the monohydroxypolyesters and monohydroxypolyethers which have been described as compounds according to formula I, can be employed as starting components. The polyesters advantageously have a molecular weight of 300 to 5000 and the polyethers advantageously have a molecular weight of 200 to 2000.

As a result of the reaction of the polyisocyanates with the compounds of formula I and/or Ia, some of the free isocyanate groups are caused to react with the hydroxyl groups of the compounds of formula I and/or Ia. It is advantageous for, on average, at least 0.7, preferably about 1, molecule of formula I and/or Ia compound to be reacted per each molecule of polyisocyanate, so that approximately one compound of formula I and/or Ia has been attached to every polyisocyanate molecule. If polyisocyanates having an average functionality greater than 3 are employed, it is also possible for a greater amount of compounds of formula I and/or Ia to be employed. As a rule, at least 2 isocyanate groups of every molecule of polyisocyanate, and about 2 isocyanate groups in the case of polyisocyanates having an average functionality less than 4, should remain unreacted, of which, in the simplest case, approximately one isocyanate group serves in each case to crosslink with compounds of formula II and/or IIa, and approximately one isocyanate group undergoes reaction with compounds of formula III. It is possible to select the individual ratios, depending on the functionality of the polyisocyanates and of the compounds of formula II and/or IIa employed, if these considerations are applied analogously. For certain applications, however, it may be useful to deviate in an individual case from the reaction ratios mentioned above.

The reaction product thus obtained then may be reacted with compounds of formula II and/or IIa. This reaction can be carried out in the same vessel as the reaction with the compounds of formula I and/or Ia. In some cases, it is also possible to react the polyisocyanates with a mixture of compounds of formula I or Ia and II or IIa. From 10 to 70% of the NCO groups of the polyisocyanates originally employed are thus reacted in the reaction, (a) with the compounds of formula I and/or Ia. The lower limit is preferably 15% and particularly preferably 20%. The upper limit is preferably 45%, particularly preferably 40% and in some cases even only 30%.

From 1 to 50% of the NCO groups of the polyisocyanates originally employed are reacted in the reaction (b) with the compounds of formula II and/or IIa. The lower limit is preferably 5% and particularly preferably 15%. The upper limit is advantageously 45%, preferably 40%, and in some cases preferably 30%.

Altogether, however, at least 20% and not more than 85% of the NCO groups of the polyisocyanates originally employed are reacted in the reactions (a) and (b), the lower limit being preferably 30%. The upper limit is advantageously 65%, preferably 60% and in some cases preferably 50%. If, therefore, the isocyanates originally employed are reacted, for example in accordance with (a), with compounds of formula I and/or Ia in quantities such that 15% of the NCO groups have been reacted, the compounds of formula II and/or IIa must be employed in the reaction (b) in amounts such that at least 5% of the NCO groups of the polyisocyanates originally employed have been reacted in the course of this reaction, that is to say a total of $15+5=20\%$.

The compounds of formula II and IIa differ from those of formula I and Ia essentially in that they contain two or three functional groups which react with the isocyanate groups. These functional groups are preferably hydroxyl groups because such compounds are readily accessible and commercially available and because the reaction products obtained are readily soluble in solvents which are used when the dispersing agents are subsequently employed in accordance with the invention. Examples of compounds of formula II include diols and triols or diamines, dialkanolamines, monoalkanolamines having 2 to 12 C atoms, dihydroxydialkyl sulfides and dihydroxy sulfones, such as butanediol, hexanediol, cyclohexanedimethanol, neopentyl glycol, ethylene glycol, alkyl-substituted dialkanolamines, glycerol, trimethylolpropane, fatty acid dialkanolamides, thiodiglycol, di-(4-hydroxyphenyl)sulfone, and hydroxylfunctional polybutadienes having an average functionality of 2 to 3. A preferred group of compounds of formula II comprises polyoxyalkylene glycols which advantageously have alkylene groups having 2 to 4, preferably 2, carbon atoms, and which preferably have molecular weights within the range of, desirably 400 to 2000, preferably 600 to 1500. Ethoxylates having 3 hydroxyl groups are obtained by polymerization using trifunctional alcohols as the starting component. Polyethylene glycols are preferred as polyoxyalkylene glycols.

It is also possible to employ, as compounds of formula II, compounds which can be obtained by polymerizing a lactone, such as has already been described, with dihydroxy or trihydroxy starting components. These polyester-polyols advantageously have an average molecular weight $M_n$ of 800 to 2000. The preferred starting component is butanediol or ethylene glycol. The diols or triols mentioned above can, however, also be suitable as starting components.

Polyurethanes, polyether-polyurethanes, polyester-polyurethanes and/or polyether-polyester-polyurethanes which can be obtained by the addition reaction of a diisocyanate with a dihydroxy compound analogously to the corresponding compounds according to formula I can be employed as compounds of formula IIa. The diisocyanates and dihydroxy compounds already mentioned in the case of the corresponding urethane-containing compounds according to formula Ia can be employed as reactants. The compounds prepared in this way have an average functionality of 2. The corresponding trifunctional compounds can be prepared by using a small amount of a trifunctional starting component. Triisocyanates, the triols mentioned above and also the trihydroxyfunctional polyesters and polyethers mentioned above can be employed as trifunctional starting components. It is advantageous for these urethane-containing compounds according to formula IIa to have an average functionality of 2 and an average molecular weight of 300 to 2500, preferably 500 to 1500.

Bis-(hydroxyalkyl)-polydimethylsiloxanes having average molecular weights $M_n$ of, advantageously, 400 to 2000 can also be employed as compounds of formula IIa.

The compounds of formula II and/or IIa effect a crosslinking between the reaction products formed from the polyisocyanate and compounds of formula I and/or Ia. In the simplest case, the starting materials are employed in amounts such that the compounds of formula II and/or IIa constitute the center of the molecule, and that the polyisocyanates whose remaining isocyanate groups have been or are reacted with compounds of formula I and/or Ia and of formula III are attached to the compounds of formula II and/or IIa via the groups E. A certain amount of over-crosslinking or under-crosslinking can, of course, also exist.

An excessively great over-crosslinking can, to a certain extent, be prevented by carrying out the reaction in dilute solutions in strongly polar, aprotic solvents, such as dimethylformamide, dimethylacetamide and N-methylpyrrolidone. The reaction with compounds of formula III is carried out in an amount such that there is at least 0.8 molecule of formula III for each unreacted isocyanate group remaining in the stages (a) and (b) If the compounds of formula III contain only one group which can react with the isocyanate groups, an excess is not necessary; rather, approximately 1 molecule of formula III is employed for each as yet unreacted isocyanate group. If the compounds of formula III contain more than one group which can react with the isocyanates, it is also sufficient if there is one molecule of formula III for each as yet unreacted isocyanate group, but in order to avoid undesirable crosslinking, a ratio significantly less than 1:1 should not be employed. A slight excess can be advantageous in avoiding undesired crosslinking. In general, an excess of 25 mole %, preferably 10 mole %, is adequate.

Q in formula III preferably represents —NH₂ or —OH. It is also preferable for Z in formula III to be a mononuclear or dinuclear heterocyclic group, one ring nitrogen atom of which is attached to the group Q, preferably through an alkylene group having 2 to 5 C atoms. Preferred heterocycles are triazole, pyrimidine, imidazole, pyridine, morpholine, pyrrolidine, piperazine, piperidine, benzimidazole, benzothiazole and/or triazine. These can contain substituents, such as up to 3, preferably 1, of the following groups: alkyl and/or alkoxy groups having 1 to 6, preferably 1 to 4, C atoms (a methoxy group being preferred), or amino groups (this results in multi-functional compounds as far as the reaction with the isocyanates is concerned).

The heterocyclic groups mentioned above can be directly attached to the group Q. They can, however, also be attached by means of a group customary in this field, such as alkylene groups having 2 to 8, preferably 2 to 4, C atoms or polyether groups having the same number of C atoms. The same applies to the tertiary amino group. It is preferable for the heterocyclic groups to be attached to the group Q via a ring nitrogen atom and an alkylene group, preferably one having 2 to 5 C atoms. Besides this ring nitrogen atom, the heterocyclic group can, of course, also contain further heteroatoms, including further ring nitrogen atoms. These further ring nitrogen atoms can, if appropriate, also contain an attached hydrogen atom (for example in the case of an N-alkylpiperazine). The heterocyclic groups can, however, as in the case of benzimidazole, also be attached by means of a ring carbon atom to the group Q, optionally via an alkylene group. The nature of the bond depends essentially on the particular structure of the heterocyclic groups and the reactivities of the individual atoms, as is known to organic chemists. In principle, it is possible to employ, as compounds of formula III, the groups which have already been used in this field of art for the preparation of other dispersing agents, for example as described in U.S. Pat. No. 4,032,698, which is incorporated herein by reference. Examples of compounds of formula III are described in U.S. Pat. No. 4,647,647, which is incorporated herein by reference. It is characteristic of these compounds that they contain, per molecule, at least one Zerewitinoff hydrogen atom which preferably reacts with the isocyanate groups, and that they additionally possess a nitrogen-containing basic group which is not capable of urea formation with isocyanate groups. These basic groups are also characterized by their pKa value in accordance with the state of the art (compare U.S. Pat. Nos. 3,817,944; 4,032,698 and 4,070,388 ). Compounds containing basic groups having a pKa value of 2 to 14 are preferred, particularly preferably a pKa value of 5 to 14 and most particularly preferably a pKa value of 5 to 12. The pKa value can be found from standard reference tables. The limiting values indicated above relate to measurement of the pKa value at 25° C. in a 0.01-molar concentration in water. In accordance with the invention, these basic groups impart basicity to the addition compounds, as is also known in this technical field (see the U.S. patents mentioned above).

As a result of these basic groups, the addition compounds are capable of forming salts. They can also be used in the form of salts of this type as dispersing agents in accordance with the invention.

These salts are obtained from the resulting reaction product by neutralization with organic or inorganic acids or by quaternization. Salts with organic monocarboxylic acids are preferred.

The preparation of the addition compounds according to the invention can be carried out, as in the state of the art, in the presence of suitable solvents or solvent mixtures. Any solvents are suitable which exhibit negligible reactivity toward the reactants and in which the reactants and the reaction products are at least partially soluble, for example hydrocarbons such as toluene or xylene, chlorinated hydrocarbons such as chloroform or trichloroethane, cyclic and acyclic ethers such as dioxane, tetrahydrofuran or polyalkylene glycol dialkyl ethers, esters such as ethyl acetate or butyl acetate, butyrolactone, alkylglycol esters such as ethylglycol acetate or methoxypropyl acetate, ketones such as methyl isobutyl ketone, cyclohexanone or acetone, acid amides such as dimethylformamide or N-methylpyrrolidone, and the like. It is advantageous to select the solvent or solvents in view of the intended field of use. For example, it is advantageous to employ solvents which are completely or partly water-dilutable for preparing addition compounds according to the invention for use in water-dilutable paint systems or for coating pigments after synthesis of the pigments in an aqueous suspension.

Depending on the field of use, the solvents used for the synthesis may remain in the reaction mixture or may be completely or partly removed and, if appropriate, replaced by other solvents. The solvent can, for example, be completely or partly replaced by being distilled off, optionally under reduced pressure and/or azeotropically with the addition of water. The active substance can, however, also be isolated by precipitation through addition of non-solvents such as aliphatic hydrocarbons, for example hexane, subsequent removal by filtration and, if appropriate, drying. The active substance obtained by one of these methods can then be dissolved in a solvent suitable for the particular field of use or, if appropriate, can be employed in pure form, for example in the case of powder paints. If desired, the solvent in which the addition product has been dissolved can be removed by distillation after suitable higher-boiling solvents have been added, optionally under reduced pressure and/or azeotropically with the addition of water, and the addition product can thereby be transferred into a solvent suitable for the particular field of use.

Furthermore, the reactions can be carried out in the presence of customary catalysts, for example organo-tin compounds such as dibutyl-tin dilaurate, other organo-metallic compounds such as iron acetylacetonate, or tertiary amines such as triethylenediamine. Reference is made in this regard to the patents cited at the beginning of the specification.

By varying the substituents of formulas I, Ia, II and IIa and/or the ratios of the latter, it is possible to adjust the compatibility of the addition compounds of the invention to a very wide variety of polymeric compounds which are present in coatings and molding materials in which the addition compounds of the invention are used. If, for example, the binder in a paint is a polyurethane, it is advantageous to employ as dispersing agents addition compounds according to the invention in which the molecules also contain urethane groups or similar groups by virtue of the groups contained in the starting compounds of formula I, Ia, II and IIa, and which (as is known to those skilled in the art) are compatible with the polyurethanes. The same applies analogously to polyacrylates, for example. This also applies analogously to the substituents of formula III, which have a particular influence on the affinity of the addition compounds according to the invention for the solids which are used and are to be dispersed.

The invention is illustrated in further detail by the following non-limiting examples. Parts are parts by weight unless otherwise stated. In the case of compounds which are non-uniform molecularly, such as polymers, the indicated molecular weights are average values in terms of number average ($M_n$). The molecular weights or average molecular weights $M_n$ can be determined by customary processes, for example by measuring the OH number or the amine number or by cryoscopic methods.

The NCO content of the polyisocyanates employed and the progress of the addition reaction are determined by methods such as are described in Saul Patai, "The Chemistry of Cyanates and their Thioderivatives", Part I, Chapter 5, 1977.

EXAMPLES OF PRODUCTION OF FORMULA I. Ia AND IIa COMPOUNDS

Polymer A:

A solution of 39.3 parts of 2-ethylhexyl acrylate, 2.9 parts of 2-mercaptoethanol, 1.1 parts of AIBN (azobis-(isobutyronitrile)) and 20 parts of ethyl acetate was added drop-wise under a protective gas to 36.7 parts of boiling ethyl acetate at such a rate that the temperature of the reaction mixture did not exceed 85° C. When the addition was complete, the mixture was stirred under reflux for a further 2 hours. The reaction mixture was washed several times with dilute NaCl solution, 200 ml of toluene were added, and the mixture was dried over a molecular sieve. After filtration the filtrate was subjected to distillation until the residue had a solids content of 92%. The polyacrylate obtained had an average molecular weight $M_n$ of 1100.

Polymers B through F:

The starting compounds listed in the following table were reacted in the amounts indicated, analogously to the preparation of polymer A.

| Polymer | $M_n$ | Starting material | Parts | Final solids Content |
|---------|-------|-------------------|-------|----------------------|
| B | 1000 | 2-Mercaptoethanol | 3.9 | 93% |
|   |      | Isodecyl methacrylate | 45.7 | |
|   |      | AIBN | 0.9 | |
|   |      | Ethyl acetate | 49.5 | |
| C | 1000 | 2-Mercaptoethanol | 3.9 | 95% |
|   |      | Pentadecyl methacrylate | 45.7 | |
|   |      | AIBN | 0.9 | |
|   |      | Ethyl acetate | 49.5 | |
| D | 1100 | 2-Mercaptoethanol | 3.5 | 87% |
|   |      | 2-Ethylhexyl methacrylate | 45.6 | |
|   |      | AIBN | 0.9 | |
|   |      | Ethyl acetate | 50.0 | |
| E | 2000 | 2-Mercaptoethanol | 1.9 | 92% |
|   |      | n-Butyl acrylate | 12.1 | |
|   |      | Lauryl acrylate | 36.4 | |
|   |      | AIBN | 1.0 | |
|   |      | Ethyl acetate | 48.6 | |
| F | 3000 | 2-Mercaptoethanol | 1.3 | 94% |
|   |      | n-Butyl acrylate | 24.1 | |
|   |      | Isodecyl methacrylate | 14.5 | |
|   |      | Vinyl ethyl ether | 9.6 | |
|   |      | AIBN | 1.0 | |
|   |      | Ethyl acetate | 49.5 | |

Polymer G:

28.3 parts of IPDI (isophorone diisocyanate), 41.4 parts of 1,12-dodecanediol, 29.9 parts of xylene and 0.005 parts of DBTL (dibutyltin dilaurate) were stirred under a protective gas at 70° C. until all the NCO groups had reacted completely. Solids content=70%. Average molecular weight=800.

Polymer H:

35.5 parts of polypropylene glycol ($M_n=400$), 14.5 parts of methylene bis-(4-cyclohexyl isocyanate) and 50 parts of MPA (methoxypropyl acetate) were stirred under a protective gas at 80° C. until all the NCO groups had reacted completely. Solids content=50%. Average molecular weight=2000.

Polymer I:

6.4 parts of 2-ethylhexanol and 93.4 parts of caprolactone were homogenized under a protective atmosphere, 0.002 part of DBTL was added and the mixture was heated to 160° C. It was stirred at this temperature until a solids content of 99% had been reached. The resulting polyester had an average molecular weight $M_n$ of 2000.

Polymer K:

44.8 parts of n-butyl acetate, 25.9 parts of IPDI, 27 parts of 1,6-hexanediol, 2.2 parts of n-butanol and 0.001 part of DBTL were stirred under a protective gas at 70° C. until all the NCO groups had reacted completely. Solids content=55%. Average molecular weight=1500.

Polymer L:

25.0 parts of xylene, 43.0 parts of IPDI, 22.5 parts of 1,6-hexanediol and 9.5 parts of 2-ethylhexanol were stirred under a protective gas at 80° C. until all the NCO groups had reacted completely. Solids content=75%. Average molecular weight=1000.

Polymer M:

31.7 parts of n-decanol were reacted, analogously to the preparation of polymer I, with 68.3 parts of caprolactone to give a polyester having an average molecular weight Mn of 500. 25.3 parts of the polyester thus obtained were stirred under a protective gas with 25.0 parts of xylene, 30.1 parts of IPDI and 19.6 parts of 2-ethylhexane-1,3-diol at 80° C. until all the NCO groups had reacted completely. Solids content=75 %. Average molecular weight=1500.

Polymer N:

A solution of 19.4 parts of the caprolactone polyester of $M_n$ 500, described under polymer M, in 19.4 parts of MPA were added drop-wise, in the course of 10 minutes, at 50° C. and under a protective gas, to 14.4 parts of toluene diisocyanate in 14.4 parts of MPA. A solution of 16.2 parts of polyethylene glycol ($M_n$=200) in 16.2 parts of MPA was then added drop-wise in the course of 10 minutes. The mixture was then heated to 70° C. and was stirred at this temperature until all the NCO groups had reacted completely. Solids content=50%. Average molecular weight=1300.

Polymer P: 23.2 parts 1,5-pentanediol Were added drop-wise with stirring to 26.8 parts phenylisocyanate in 50 parts N-methylpyrrolidone under a protective atmosphere at 50 ° C. Stirring was subsequently continued at 70° C. until all the NCO groups had reacted. Solids content=50%. Average molecular weight=220.

GENERAL PREPARATION PROCEDURE FOR EXAMPLES 1 TO 20

Stage a: The starting materials listed in the table were combined under a protective gas in the ratios indicated, 0.01 part of dibutyltin dilaurate was added and the mixture was stirred at 80° C. The first stage was complete as soon as the proportion, indicated in the table, of NCO groups originally employed had reacted completely.

Stage b: After the completion of the first stage, the components of stage (b) were added and the reaction mixture was stirred further at 80° C. until the degree of NCO reaction indicated in the table had been reached.

Stage c: In order to complete the reaction of the remaining NCO groups, the components of stage (c) were added to the reaction mixture and stirring was continued for 1 hour at 80° C.

The solids contents of the products are listed in the following table.

The following polyisocyanates were employed in the preparation examples:

Polyisocyanate (1): An aromatic polyisocyanate based on toluene diisocyanate (TDI); 75% strength in ethyl acetate; for example Desmodur L Polyisocyanate (2): An aliphatic polyisocyanate based on hexamethylene diisocyanate (HMDI); 75% strength in 1:1 xylene/ethyl glycol acetate; for example Desmodur N.

Polyisocyanate (3): An aromatic-aliphatic polyisocyanate based on HMDI/TDI; 60% strength in ethyl acetate; for example Desmodur HL.

Polyisocyanate (4): An aromatic polyisocyanate based on TDI; 51% strength in butyl acetate; for example Desmodur IL.

Polyisocyanate (5): An aromatic polyisocyanate based on TDI; 50% strength in isobutyl acetate; for example Polyurene KC.

Polyisocyanate (6): An aromatic polyisocyanate based on TDI/diphenylmethane 4,4-diisocyanate; 50% strength in isobutyl acetate; for example Polyuren HR.

PRODUCTION EXAMPLES 18–20:

The compounds of Examples 18 through 20 listed in the following table were prepared following the general procedure described for Examples 1 through 17.

Example 20 is a comparative example corresponding to European Patent Application No. EP 154,678. It differs from Example 19 only by the absence of an amount according to the present invention of a urethane-group containing component Y'—OH (Polymer P). While in Example 19, 99 mole-% octanol were used as the ingredient of formula Y—OH and 1 mole-% Polymer P was used as the ingredient of formula Y'—OH, in Example 20 only octanol was used.

EXAMPLE b 21

Example 3 is repeated except that the components of stages (a) and (b) are employed as a mixture, and the components of stage (c) are added after 83% of the NCO-groups originally present have been reacted.

EXAMPLE 22

Example 3 is repeated except that the components of stages (b) and (c) are employed as a mixture. Stirring is continued at 80° C. until no NCO-groups are detectable.

| Example No. | Stage (a): Components | Parts | % of NCO | Stage (b): Components | Parts | % of NCO | Stage (c): Components | Parts | Final solids content (%) |
|---|---|---|---|---|---|---|---|---|---|
| 1 | Polyisocyanate (2) | 11.3 | | Polyethylene glycol Mn = 1000 | 1.0 | | N,N-Dimethyl-1,3-propanediamine | 1.8 | |
| | Polymer L | 25.0 | 40 | Butyl acetate | 7.2 | 20 | NMP (N-methylpyrro- | 35.5 | 19 |

4,942,213

-continued

| Example No. | Stage (a): Components | Parts | % of NCO | Stage (b): Components | Parts | % of NCO | Stage (c): Components | Parts | Final solids content (%) |
|---|---|---|---|---|---|---|---|---|---|
|  |  |  |  |  |  |  | lidone |  |  |
|  | Xylene | 18.2 |  |  |  |  |  |  |  |
| 2 | Polyisocyanate (2) | 15.1 |  | Cyclohexane-dimethanol | 1.0 |  | N,N-Dimethyl-ethoxyethanol- | 4.8 |  |
|  | Polymer N | 25.7 | 20 |  |  | 25 | amine |  | 30 |
|  | MPA (Methoxypropyl acetate) | 7.6 |  | MPA | 6.6 |  | MPA | 39.2 |  |
| 3 | Polyisocyanate (6) | 9.0 |  | Polymer H | 2.7 |  | Di-(2-picolyl)-amine | 0.6 |  |
|  | Polymer I | 23.5 | 70 |  |  | 13 |  |  | 30 |
|  | Butyl acetate | 23.5 |  |  |  |  | Butyl acetate | 40.7 |  |
| 4 | Polyisocyanate (2) | 10.2 |  | Polyethylene glycol Mn = 1000 | 3.7 |  | 1-(3-Aminopropyl)-imidazole | 1.9 |  |
|  | Polymer A | 18.3 | 40 |  |  | 20 |  |  | 30 |
|  | MPA | 20.5 |  | MPA | 41.2 |  | MPA | 4.2 |  |
| 5 | Polyisocyanate (2) | 7.8 |  | Polyethylene glycol Mn = 1000 | 3.1 |  | 1-(3-Aminopropyl)-imidazole | 1.6 |  |
|  | Polymer K | 26.3 | 40 |  |  | 20 |  |  | 25 |
|  | Xylene | 6.5 |  | MPA | 34.3 |  | MPA/NMP 2:8 | 20.4 |  |
| 6 | Polyisocyanate (1) | 8.8 |  | 1,6-Hexanediol | 0.2 |  | 4-(2-Aminoethyl)-pyridine | 1.4 |  |
|  | Polymer B | 15.2 | 50 |  |  | 10 |  |  | 22 |
|  | MPA | 17.5 |  | MPA | 28.1 |  | MPA/NMP 1:9 | 28.8 |  |
| 7 | Polyisocyanate (5) | 29.0 |  | Polyethylene glycol Mn = 300 | 2.2 |  | N,N-Dimethyl-1,3-propanediamine | 2.4 |  |
|  | Polymer C | 1.7 | 20 |  |  | 30 |  |  | 30 |
|  | MPA/NMP 1:1 | 19.9 |  | MPA | 29.2 |  | MPA | 5.6 |  |
| 8 | Polyisocyanate (1) | 8.5 |  | Polypropylene glycol Mn = 1000 | 3.9 |  | N-Aminopropyl-morpholine | 1.6 |  |
|  | Polymer D | 12.4 | 35 |  |  | 30 |  |  | 23 |
|  | MPA | 13.3 |  | MPA | 31.9 |  | MPA/NMP 1:9 | 28.4 |  |
| 9 | Polyisocyanate (2) | 8.1 |  | Trimethylol-propane | 0.1 |  | 1-(2-Hydroxy-ethyl)-piperidine | 1.5 |  |
|  | Polymer D | 25.8 | 60 |  |  | 5 |  |  | 30 |
|  | MPA | 22.9 |  | MPA | 38.2 |  | MPA | 3.4 |  |
| 10 | Polyisocyanate (2) | 8.0 |  | 1,4-Diamino-butane | 0.2 |  | 1-(2-Hydroxy-ethyl)-piperazine | 2.5 |  |
|  | Polymer E | 12.6 | 20 |  |  | 10 |  |  | 20 |
|  | MPA | 14.5 |  | MPA/NMP 1:1 | 44.2 |  | NMP | 18.0 |  |
| 11 | Polyisocyanate (3) | 11.0 |  | Polyethylene glycol Mn = 600 | 1.0 |  | 4-(2-Hydroxy-ethyl)morpholine | 1.0 |  |
|  | Polymer E | 23.3 | 45 |  |  | 15 |  |  | 30 |
|  | MPA/NMP 4:6 | 51.7 |  | MPA | 9.7 |  | MPA | 2.3 |  |
| 12 | Polyisocyanate (2) | 7.1 |  | Polybutadiene-diol MN = 1000 | 1.3 |  | N,N-Dimethyl-1,3-propanediamine | 2.1 |  |
|  | Polymer F | 12.2 | 15 |  |  | 10 |  |  | 20 |
|  | MPA | 14.3 |  | MPA/NMP 3:7 | 36.8 |  | NMP | 26.2 |  |
| 13 | Polyisocyanate (4) | 11.1 |  | Polyethylene glycol Mn = 1000 | 0.5 |  | N,N-Dimethyl-1,3-propanediamine | 0.9 |  |
|  | Polymer L | 6.0 | 40 |  |  | 20 |  |  | 20 |
|  | Polymer I | 8.5 |  | Butyl acetate | 0.5 |  | NMP | 60.8 |  |
|  | Butyl acetate | 11.7 |  |  |  |  |  |  |  |
| 14 | Polyisocyanate (4) | 13.0 |  | Polymer G | 2.9 |  | N,N-Diethyl-butane-1,4-diamine | 1.4 |  |
|  | Polymer I | 19.9 | 40 |  |  | 20 |  |  | 30 |
|  | NMP | 33.4 |  | Xylene | 2.2 |  | Xylene | 27.2 |  |
| 15 | Polyisocyanate (2) | 6.6 |  | Polyethylene glycol Mw = 300 | 0.3 |  | N,N-dimethyl-ethanolamine | 0.9 |  |
|  | Polymer I | 23.1 | 45 |  |  | 15 |  |  | 30 |
|  | NMP | 27.1 |  | Polymer G | 1.1 |  | Xylene | 40.9 |  |
| 16 | Polyisocyanate (2) | 11.3 |  | Polyethylene glycol Mw = 1000 | 1.0 |  | N,N-dimethyl-1,3-propanediamine | 1.8 |  |
|  | Polymer L | 25.0 | 40 |  |  | 20 |  |  | 30 |
|  | Xylene | 18.2 |  | Butyl acetate | 7.2 |  | NMP | 35.5 |  |
| 17 | Polyisocyanate (1) | 10.3 |  | Polytetrahydro-furandiol Mw = 640 | 3.5 |  | 2-(1-pyrrolidyl)-ethylamine | 1.0 |  |
|  | Polymer M | 23.6 | 35 |  |  | 35 |  |  | 30 |
|  | Xylene | 17.0 |  | Xylene | 28.2 |  | NMP | 16.2 |  |
| 18 | Polyisocyanate (2) | 8.7 |  | Bis(hydroxymethyl-polydimethylsiloxane Mw = 600 | 1.4 |  | 4-(2-hydroxyethyl)-morpholine | 1.7 |  |
|  | Polymer I | 30.2 | 45 |  |  | 15 |  |  | 40 |
|  | MPA | 34.7 |  | MPA | 1.4 |  | MPA | 21.9 |  |
| 19 | Polyisocyanate (3) | 33.9 |  | Cyclohexanedimethanol | 0.5 |  | 4-(2-hydroxyethyl)-morpholine | 2.0 |  |
|  | Polymer P | 0.25 | 0.7 |  |  | 10 |  |  | 30 |
|  | Octanol | 7.0 | 69.3 |  |  |  | MPA | 4.5 |  |

-continued

| Example No. | Stage (a): Components | Parts | % of NCO | Stage (b): Components | Parts | % of NCO | Stage (c): Components | Parts | Final solids content (%) |
|---|---|---|---|---|---|---|---|---|---|
| 20* | MPA | 13.6 | | MPA | 37.8 | | | | |
| | Polyisocyanate (3) | 33.9 | | Cyclohexanedimethanol | 0.5 | | 4-(2-hydroxyethyl)-morpholine | 2.0 | |
| | Octanol | 7.1 | 70.0 | | | 10 | | | 30 |
| | MPA | 13.9 | | MPA | 37.8 | | | | |

*Comparison Example according to EP 154,678

USE EXAMPLE:

The addition compound obtained in Example 3 was used to prepare a pigment paste. This was effected by combining 386.5 g of C.I.1 Pigment White 6 (77.3%), 25.0 g of product solution from Example 3, 88.5 g of MPA and 300 g of glass beads and then dispersing the mixture for 20 minutes at 40° C., using a 40 mm diameter polypropylene disk. When the glass beads had been filtered out, a free-flowing pigment paste with excellent rheological properties was obtained. High-gloss paint films having a fault-free surface were obtained by adding 20% of this pigment to an acrylic/melamine clear lacquer (58.1% of extraneously crosslinking acrylic resin, 14.9% of melamine resin and 27% of an aromatic fraction, b.p.=163°-181° C.) and to an aldehyde resin clear lacquer (42.8% of aldehyde resin and 57.2% of xylene).

When a pigment paste was prepared under the same conditions using the same pigment, without adding the addition compound, it was only possible to reach a maximum pigment content of 42%.

Similar results were obtained with other pigments (in MPA as solvent):

| Pigment | Pigment Content Additive Paste | % Addition Compound according to Example 3 | Pigment Content in Blank Sample |
|---|---|---|---|
| C.I.1 PR 101 | 72.5% | 6.5% | 50% |
| Gas Carbon Black Regular Color Channel | 13.3% | 11.5% | 6.3% |
| C.I.1 PR 177 | 12.4% | 10% | 7.8% |

Pigment pastes were produced in methoxypropyl acetate (MPA) with C.I. PR 101 and the addition compounds according to the invention obtained in Examples 18 and 19 and the comparison compound obtained in Example 20.

| Production Example | Pigment Content | % Addition Compound | % MPA |
|---|---|---|---|
| 18 | 75.7% | 5.3% | 19.0% |
| 19 | 66.8% | 8.7% | 24.5% |
| 20 | 66.8% | 8.7% | 24.5% |

In a blank sample produced for comparison purposes containing no addition compound the maximum pigment content at which a still fluid paste could be obtained was only 50%.

The viscosity (shear speed 20 s$^{-1}$) of the paste obtained with the additive of the invention according to Example 19 was 2000 mPas and thus was substantially lower than that of the paste produced with the comparison compound according to Example 20, which had a viscosity of 2600 mPas.

Similar results were obtained with C.I.1 Pigment White 6:

| Production Example | Pigment Content | % Addition Compound | % MPA |
|---|---|---|---|
| 18 | 80.9% | 4.8% | 14.3% |
| 19 | 68.0% | 6.1% | 25.9% |
| 20 | 66.9% | 6.1% | 27.0% |
| Blank | 42.0% | 0 | 58.0% |

The foregoing description and examples have been set forth merely to illustrate the invention and are not intended to be limiting. Since modifications of the described embodiments incorporating the spirit and substance of the invention may occur to persons skilled in the art, the scope of the invention should be limited solely with reference to the appended claims and equivalents.

What is claimed is:

1. An addition compound or salt thereof useful as a dispersing agent or dispersion stabilizer obtained by
(a) reacting a polyisocyanate having an average functionality of 2.5 to 10 with a monohydroxy compound of formula I

Y—OH      I in which Y represents
(i) an aliphatic or cycloaliphatic hydrocarbon group having 8 to 30 carbon atoms in which hydrogen atoms may be partly replaced by halogen or aryl substituents, or
(ii) an aliphatic, cycloaliphatic or aromatic group containing at least one —O— or —COO— group, having an average molecular weight $M_n$ of 200 to 10,000, and in which hydrogen atoms may be partly replaced by halogen,
in an amount sufficient to react 10 to 70% of the isocyanate groups originally present in the isocyanate;
(b) reacting with a compound of formula II G—(E)$_n$      II in which
E represents at least one of —OH, —NH$_2$ and —NHR in which R is an alkyl group having 1 to 4 carbon atoms,
n represents 2 or 3, and
G represents an aliphatic, cycloaliphatic and/or aromatic group containing at least 2 carbon atoms, having an average molecular weight $M_n$ of not more than 3000, and which may contain at least one group selected from the group consisting of —O—, —COO—, —CONH—, —S— and —SO$_2$—, in an amount sufficient to react 1 to 50% of the isocyanate groups originally present in the isocyanate, and to react a total of 20 to 85% of the isocyanate groups originally present in the polyisocyanate in stages (a) and (b); and (c) reacting with a compound of formula III $$Z\text{---}(CH_2)_p\text{---}Q \qquad \text{III}$$

in which

Q represents —OH, —SH, —NH$_2$ or —NHR in which R is an alkyl group having 1 to 4 carbon atoms, Z represents an aliphatic group having 2 to 10 C atoms and carrying at least one tertiary amino group or represents a heterocyclic group having at least one basic ring nitrogen atom not bonded to a hydrogen atom, and p is 0 when Z is an aliphatic group or an integer from 0 to 10 when Z is a heterocyclic group, in an amount sufficient to provide at least one molecule of formula III for each isocyanate group in the polyisocyanate unreacted after stages (a) and (b);

wherein at least 1 mole % of the compound of formula I defined above is replaced by a compound of formula Ia $$Y'\text{---}OH \qquad \text{Ia}$$

in which Y' represents an aliphatic, cycloaliphatic or aromatic group having an average molecular weight M$_n$ of 200 to 10,000 in which hydrogen atoms may be partly replaced by halogen and containing at least one —NHCOO— group, or at least 1 mole % of the compound of formula I defined above is replaced by a monohydroxyfunctional polyacrylic or polymethacrylic acid ester or a copolymer thereof with up to 50 mole % relative to monomer units of a vinyl comonomer, having an average molecular weight M$_n$ of not more than 10,000, or at least 1 mole % of the compound of formula II defined above is replaced by a compound of formula IIa $$G'\text{---}(OH)_n \qquad \text{IIa}$$

in which G' represents an aliphatic, cycloaliphatic or aromatic group containing at least 2 carbon atoms, having an average molecular weight M$_n$ of not more than 3000, and containing at least one —NHCOO— or —Si(CH$_3$)$_2$O— group, and n represents a number from 2 to 3.

2. An addition compound or salt thereof according to claim 1, wherein said polyisocyanate is reacted in the presence of a solvent.

3. An addition compound or salt thereof according to claim 1, wherein said polyisocyanate is reacted in the presence of a reaction catalyst.

4. An addition compound or salt thereof according to claim 1, wherein from 15 to 45% of the isocyanate groups originally present in the polyisocyanate are reacted in stage (a).

5. An addition compound or salt thereof according to claim 1, wherein from 20 to 40% of the isocyanate groups originally present in the polyisocyanate are reacted in stage (a).

6. An addition compound or salt thereof according to claim 1, wherein a further 5 to 45% of the isocyanate groups originally present in the polyisocyanate are reacted in stage (b) and a total of 30 to 65% of the isocyanate groups originally present in the polyisocyanate are reacted in stages (a) and (b).

7. An addition compound or salt thereof according to claim 1, wherein a further 15 to 40% of the isocyanate groups originally present in the polyisocyanate are reacted in stage (b) and a total of 40 to 60% of the isocyanate groups originally present in the polyisocyanate are reacted in stages (a) and (b).

8. An addition compound or salt thereof according to claim 1, wherein said vinyl comonomer is selected from the group consisting of vinyl esters, vinyl ethers, styrene, vinyltoluene and vinylcyclohexane.

9. An addition compound or salt thereof according to claim 1, wherein at least 5 mole % of the compound of formula I defined above is replaced by a compound of formula Ia or by a monohydroxyfunctional polyacrylic or polymethacrylic acid ester or a copolymer thereof, or at least 5 mole % of the compound of formula II defined above is replaced by a compound of formula IIa.

10. An addition compound or salt thereof according to claim 1, wherein at least 50 mole % of the compound of formula I defined above is replaced by a compound of formula Ia or by a monohydroxyfunctional polyacrylic or polymethacrylic acid ester or a copolymer thereof, or at least 50 mole % of the compound of formula II defined above is replaced by a compound of formula IIa.

11. An addition compound or salt thereof according to claim 1, wherein said monohydroxy compound of formula Ia is selected from the group consisting of polyurethanes, polyether-polyurethanes, polyester-polyurethanes and polyether-polyester-polyurethanes having average molecular weights M$_n$ of 500 to 3000.

12. An addition compound or salt thereof according to claim 1, wherein said compound of formula IIa is selected from the group consisting of polyurethanes, polyether-polyurethanes, polyester-polyurethanes and polyether-polyester-polyurethanes having 2 to 3 OH groups and average molecular weights M$_n$ of 300 to 2500.

13. A process for producing an addition compound or salt thereof useful as a dispersing agent or dispersion stabilizer comprising the steps of:

(a) reacting a polyisocyanate having an average functionality of 2.5 to 10 with a monohydroxy compound of formula I $$Y\text{---}OH \qquad \text{I}$$

in which Y represents (i) an aliphatic or cycloaliphatic hydrocarbon group having 8 to 30 carbon atoms in which hydrogen atoms may be partly replaced by halogen or aryl substituents, or (ii) an aliphatic, cycloaliphatic or aromatic group containing at least one —O— or —COO— group, having an average molecular weight M$_n$ of 200 to 10,000, and in which hydrogen atoms may be partly replaced by halogen, in an amount sufficient to react 10 to 70% of the isocyanate groups originally present in the isocyanate;

(b) reacting with a compound of formula II $$G\text{---}(E)_n \qquad \text{II}$$

in which

E represents at least one of —OH, —NH₂ and —NHR in which R is an alkyl group having 1 to 4 carbon atoms, n represents 2 or 3, and G represents an aliphatic, cycloaliphatic and/or aromatic group containing at least 2 carbon atoms, having an average molecular weight $M_n$ of not more than 3000, and which may contain at least one group selected from the group consisting of —O—, —COO—, —CONH—, —S— and —SO₂—, in an amount sufficient to react 1 to 50% of the isocyanate groups originally present in the isocyanate, and to react a total of 20 to 85% of the isocyanate groups originally present in the polyisocyanate in stages (a) and (b); and (c) reacting with a compound of formula III $$Z-(CH_2)_p-Q \qquad \text{III}$$

in which

Q represents —OH, —SH, —NH₂ or —NHR in which R is an alkyl group having 1 to 4 carbon atoms, Z represents an aliphatic group having 2 to 10 C atoms and carrying at least one tertiary amino group or represents a heterocyclic group having at least one basic ring nitrogen atom not bonded to a hydrogen atom, and p is 0 when Z is an aliphatic group or an integer from 0 to 10 when Z is a heterocyclic group, in an amount sufficient to provide at least one molecule of formula III for each isocyanate group in the polyisocyanate unreacted after stages (a) and (b); wherein at least 1 mole % of the compound of formula I defined above is replaced by a compound of formula Ia $$Y'-OH \qquad \text{Ia}$$

in which Y' represents an aliphatic, cycloaliphatic or aromatic group having an average molecular weight $M_n$ of 200 to 10,000 in which hydrogen atoms may be partly replaced by halogen and containing at least one —NHCOO— group, or at least 1 mole % of the compound of formula I defined above is replaced by a monohydroxyfunctional polyacrylic or polymethacrylic acid ester or a copolymer thereof with up to 50 mole % relative to monomer units of a vinyl comonomer, having an average molecular weight $M_n$ of not more than 10,000, or at least 1 mole % of the compound of formula II defined above is replaced by a compound of formula IIa $$G'-(OH)_n \qquad \text{IIa}$$

in which G' represents an aliphatic, cycloaliphatic or aromatic group containing at least 2 carbon atoms, having an average molecular weight $M_n$ of not more than 3000, and containing at least one —NHCOO— or —Si(CH₃)₂O— group, and n represents a number from 2 to 3.

14. A process according to claim 13, wherein the reaction product of stage (c) is an addition compound incorporating at least one basic nitrogen group, further comprising the step of reacting the product of stage (c) with an acid to form an acid addition salt.

15. A process according to claim 13, wherein from 15 to 45% of the isocyanate groups originally present in the polyisocyanate are reacted in stage (a).

16. A process according to claim 13, wherein from 20 to 40% of the isocyanate groups originally present in the polyisocyanate are reacted in stage (a).

17. A process according to claim 13, wherein a further 5 to 45% of the isocyanate groups originally present in the polyisocyanate are reacted in stage (b) and a total of 30 to 65% of the isocyanate groups originally present in the polyisocyanate are reacted in stages (a) and (b).

18. A process according to claim 13, wherein a further 15 to 40% of the isocyanate groups originally present in the polyisocyanate are reacted in stage (b) and a total of 40 to 60% of the isocyanate groups originally present in the polyisocyanate are reacted in stages (a) and (b).

19. A process according to claim 13, wherein at least 5 mole % of the compound of formula I defined above is replaced by a compound of formula Ia or by a monohydroxyfunctional polyacrylic or polymethacrylic acid ester or a copolymer thereof, or at least 5 mole % of the compound of formula II defined above is replaced by a compound of formula IIa.

20. A process according to claim 13, wherein at least 50 mole % of the compound of formula I defined above is replaced by a compound of formula Ia or by a monohydroxyfunctional polyacrylic or polymethacrylic acid ester or a copolymer thereof, or at least 50 mole % of the compound of formula II defined above is replaced by a compound of formula IIa.

21. A process according to claim 13, wherein the monohydroxy compound of formula Ia is selected from the group consisting of polyurethanes, polyether-polyurethanes, polyester-polyurethanes and polyether-polyester-polyurethanes having average molecular weights $M_n$ of 500 to 3000.

22. A process according to claim 13, wherein the compound of formula IIa is selected from the group consisting of polyurethanes, polyether-polyurethanes, polyester-polyurethanes and polyether-polyester-polyurethanes having 2 to 3 OH groups and average molecular weights $M_n$ of 300 to 2500.

23. A process of stabilizing a dispersion of a pulverulent or fibrous solid in a liquid system comprising the step of adding to said system an effective dispersion stabilizing amount of an addition compound or salt thereof according to claim 1.

24. A process according to claim 23, wherein said solid is a pigment particle.

25. A process of increasing the dispersibility of a pulverulent or fibrous solid in a liquid system comprising the step of applying to said solid an effective dispersibility enhancing amount of an addition compound or salt thereof according to claim 1.

26. A process according to claim 25, wherein said solid is a pigment particle.

27. Liquid dispersible pulverulent or fibrous solids coated with a dispersing agent comprising an addition compound or salt thereof obtained by (a) reacting a polyisocyanate having an average functionality of 2.5 to 10 with a monohydroxy compound of formula I $$Y-OH \qquad \text{I}$$

in which Y represents (i) an aliphatic or cycloaliphatic hydrocarbon group having 8 to 30 carbon atoms in which hydrogen atoms may be partly replaced by halogen or aryl substituents, or (ii) an aliphatic, cycloaliphatic or aromatic group containing at least one —O— or —COO— group, having an average molecular weight $M_n$ of 200 to 10,000, and in which hydrogen atoms may be partly replaced by halogen, in an amount sufficient to react 10 to 70% of the isocyanate groups originally present in the isocyanate;

(b) reacting with a compound of formula II $$G-(E)_n \qquad \text{II}$$

in which

E represents at least one of —OH, —NH$_2$ and —NHR in which R is an alkyl group having 1 to 4 carbon atoms, n represents 2 or 3, and G represents an aliphatic, cycloaliphatic and/or aromatic group containing at least 2 carbon atoms, having an average molecular weight $M_n$ of not more than 3000, and which may contain at least one group selected from the group consisting of —O—, —COO—, —CONH—, —S— and —SO$_2$—, in an amount sufficient to react 1 to 50% of the isocyanate groups originally present in the isocyanate, and to react a total of 20 to 85% of the isocyanate groups originally present in the polyisocyanate in stages (a) and (b); and (c) reacting with a compound of formula III $$Z-(CH_2)_p-Q \qquad \text{III}$$

in which

Q represents —OH, —SH, —NH$_2$ or —NHR in which R is an alkyl group having 1 to 4 carbon atoms, Z represents an aliphatic group having 2 to 10 C atoms and carrying at least one tertiary amino group or represents a heterocyclic group having at least one basic ring nitrogen atom not bonded to a hydrogen atom, and p is 0 when Z is an aliphatic group or an integer from 0 to 10 when Z is a heterocyclic group, in an amount sufficient to provide at least one molecule of formula III for each isocyanate group in the polyisocyanate unreacted after stages (a) and (b);

wherein at least 1 mole % of the compound of formula I defined above is replaced by a compound of formula Ia $$Y'-OH \qquad \text{Ia}$$

in which Y' represents an aliphatic, cycloaliphatic or aromatic group having an average molecular weight $M_n$ of 200 to 10,000 in which hydrogen atoms may be partly replaced by halogen and containing at least one —NHCOO— group, or at least 1 mole % of the compound of formula I defined above is replaced by a monohydroxyfunctional polyacrylic or polymethacrylic acid ester or a copolymer thereof with up to 50 mole % relative to monomer units of a vinyl comonomer, having an average molecular weight Mn of not more than 10,000, or at least 1 mole % of the compound of formula II defined above is replaced by a compound of formula IIa $$G'-(OH)_n \qquad \text{IIa}$$

in which G' represents an aliphatic, cycloaliphatic or aromatic group containing at least 2 carbon atoms, having an average molecular weight $M_n$ of not more than 3000, and containing at least one —NHCOO— or —Si(CH$_3$)$_2$O— group, and n represents a number from 2 to 3.

28. Pulverulent solids according to claim 27, wherein said solids are pigment particles.

* * * * *